(12) United States Patent
Amendolea

(10) Patent No.: US 6,948,402 B1
(45) Date of Patent: Sep. 27, 2005

(54) ROTARY WORK TABLE WITH CYCLOIDAL DRIVE GEAR SYSTEM

(75) Inventor: Richard M. Amendolea, Canfield, OH (US)

(73) Assignee: Centricity Corporation, Girard, OH (US)

( * ) Notice: Subject to any disclaimer, the term of this patent is extended or adjusted under 35 U.S.C. 154(b) by 49 days.

(21) Appl. No.: 10/242,329

(22) Filed: Sep. 12, 2002

Related U.S. Application Data

(60) Provisional application No. 60/318,974, filed on Sep. 12, 2001.

(51) Int. Cl.$^7$ ................................. F16H 1/06
(52) U.S. Cl. .................... 74/820; 74/813 R; 74/415
(58) Field of Search ............... 74/415, 813 R, 74/816, 820; 409/219, 221

(56) References Cited

U.S. PATENT DOCUMENTS

| | | | |
|---|---|---|---|
| 1,828,114 A | 10/1931 | Hubbard | |
| 1,914,797 A * | 6/1933 | Baker | 74/415 |
| 2,293,907 A * | 8/1942 | Le Bus | 74/415 |
| 2,548,603 A | 4/1951 | Hallstrand | |
| 2,965,208 A | 12/1960 | Forster et al. | |
| 2,966,806 A | 1/1961 | Luning | |
| 3,035,454 A | 5/1962 | Luning | |
| 3,037,396 A | 6/1962 | Martin | |
| 3,122,938 A | 3/1964 | Visser | |
| 3,213,704 A | 10/1965 | J.A. McDougal | |
| 3,310,990 A | 3/1967 | Zettel | |
| 3,377,877 A * | 4/1968 | Eaton | 74/395 |
| 3,709,055 A | 1/1973 | Grove | |
| 4,036,071 A | 7/1977 | McKnight et al. | |
| 4,066,356 A | 1/1978 | Parker | |
| 4,077,273 A * | 3/1978 | Osborn | 74/415 |
| 4,102,366 A * | 7/1978 | Puskarz | 141/150 |
| 4,116,081 A | 9/1978 | Luttrell et al. | |
| 4,140,026 A | 2/1979 | Rouverol | |
| 4,155,599 A | 5/1979 | Groger et al. | |
| 4,228,696 A | 10/1980 | Jablonsky | |
| 4,270,401 A | 6/1981 | Davidson | |
| 4,292,857 A | 10/1981 | Matusz | |
| 4,294,132 A | 10/1981 | Matusz | |
| 4,305,307 A | 12/1981 | Kiunke | |
| 4,487,088 A | 12/1984 | Olson | |
| 4,879,920 A | 11/1989 | Kerkhoff | |
| 5,170,678 A | 12/1992 | Wawrzyniak et al. | |
| 5,950,503 A | 9/1999 | Amendolea | |
| 2003/0195076 A1 * | 10/2003 | Ballard | 475/168 |

* cited by examiner

*Primary Examiner*—David M. Fenstermacher
(74) *Attorney, Agent, or Firm*—The Webb Law Firm

(57) ABSTRACT

A rotary table or turntable includes a work supporting platform with a driven pin carrier attached thereto. The pin carrier includes a circular array of pins engaged with a driven cycloidal gear. The cycloidal gear is driven by a prime mover, such as a servomotor, and a controller whereby the turntable is provided with a cycloidal pin gearing drive arrangement with antibacklash properties for improved positioning of work pieces on the work supporting surface.

14 Claims, 4 Drawing Sheets

ROTARY WORK TABLE WITH CYCLOIDAL DRIVE GEAR SYSTEM

RELATED APPLICATION

The present invention claims the benefit of U.S. Provisional Application Ser. No. 60/318,974 filed Sep. 12, 2001 entitled "ROTARY WORK TABLE WITH CYCLOIDAL DRIVE GEAR SYSTEM" which is incorporated herein by reference in its entirety.

BACKGROUND OF THE INVENTION

1. Field of the Invention

This invention relates generally to rotary tables. More particularly, the present invention relates to a rotary indexable table having a cycloidal drive gear.

2. Background Information

Rotary tables, such as rotary indexable tables, are well-known for the accurate positioning of work pieces at work stations for automated operations. Rotary indexable tables typically have a table and an indexer assembly that rotates the table through a predetermined angle for positioning work pieces for sequential automated operations.

Rotary indexable tables have been successfully employed in the field of automated assembly for work stations including pick and place devices, feeder bowls, visual inspections, label applicators, robot arms, adhesive applicators, laser machining and other automated assembly processes. Rotary indexable tables are further well-known in the fields of machining for the accurate positioning of work pieces to receive drilling, boring, tapping, CNC machining, facing, grinding, and other types of machining processes. Other uses for rotary indexable tables include the accurate positioning of work pieces for coating, sterilizing, cleaning, testing and calibrating.

As described in U.S. Pat. No. 5,950,503, which is incorporated herein by reference, rotary indexable tables have also been used in the decorating field for screen printing, hot stamping, pad printing, ink jet printing, impact marking, laser marking, spray painting and other decorative processes. For example, rotary indexable tables are currently employed for multi-color screen printing onto work pieces such as CD's, credit cards, key fobs, etc. Typically, a rotary indexable table supports multiple, equidistantly positioned fixtures. The fixtures receive and support the work pieces during the printing operations. At a first work station, a work piece is automatically positioned onto the fixture. The table then rotates through a precise angle or distance to position the work piece under a first screen printing apparatus. After the printing is completed, the table rotates through the same angle again to position the work piece for receiving a second overlaying screen print image. The indexing process continues until the work piece has received all the required layers of screen printing and is removed from the fixture at a final work station.

With the need for very precise machining and close tolerances in manufacture, rotary indexable tables have had to be much more precise and provide more through-put in order for the industry to remain competitive. Rotary indexable tables, for example, may be required to move through a complex set of rotary profiles such as continuous rotation, indexing with a dwell time, oscillation, variable speed or reverse direction. It would be advantageous to have an assembly capable of all these motions while maintaining precision. In addition, with the advent of robotics these assemblies are required to place a work piece at various work angles relative to the work station to provide access from automated operational equipment.

Typically, prior art rotary indexable tables, also known as turntables, are centrally driven and work is performed at the periphery of the table. Alternately, when tables are driven on their outside diameter, the drive mechanism tends to be outside the periphery of the table and thus impedes use of the assembly in various angles and in operations where space is at a premium. Additionally, this configuration interferes with operations to be performed with large overhanging work pieces which was discussed in U.S. Pat. No. 5,950,503 addressing the precision of the drive system for an open center turntable, and which is incorporated herein by reference. Because of the preciseness of the operations to be performed at a particular work station, the indexing and rotational positioning of such tables has become hypercritical.

Additional attempts have been made to improve the operation of turntables. For example, U.S. Pat. No. 2,965,208 discloses a turntable system utilizing a central shaft operably connected to its drive to rotate the table. The table also supports a plurality of rotatable spindles separately driven to accommodate actions requiring rotation of the work piece at an indexed position of the table. U.S. Pat. No. 5,170,678 discloses an index table which utilizes a table top having an open center and ring gear/pinion gear drive system located beneath the rim of the table top. The table top is supported on a fluid (air or oil) cushion during rotation. After the position is indexed, the cushion is removed and the table top lowered by gravity into place on a fixed support. While suited for its intended purpose, this assembly still suffers from the limitations herein discussed and is not readily adaptable for operation in a variety of orientations. A commercial assembly marketed by Camco utilizes a shaft-driven cam to drive an index table wheel having a center hole and supported by a bearing system located beneath it. This system is also limited in its operational versatility, is still weighty, and does not minimize energy requirements.

It is an object of the present invention to improve the precision of the drive of a rotary table, such as a rotary indexable table. One aspect of the present invention is to look toward distinct gearing arrangements to improve the drive of a rotary indexable table. For example, U.S. Pat. No. 4,879,920 pertains to antibacklash gears that mesh, including rack and pinion gears and, in particular, to gear tooth geometries that both minimize sliding friction and limit backlash between the gears.

Antibacklash rack and pinion gear sets are disclosed in U.S. Pat. Nos. 2,548,603, 4,066,356 and 4,228,696. Antibacklash gears utilizing displaced parallel gears meshing with common pinions are disclosed in U.S. Pat. Nos. 2,966,806, 3,035,454 and 3,037,396. U.S. Pat. No. 3,122,938 discloses an elastic web between a rigid hub and a rigid rim and teeth to preload the gear set and reduce backlash. U.S. Pat. No. 3,213,704 discloses light duty gear sets, wherein the gears are positioned to cause a resilient distortion and radial flexing to provide the zero backlash effect. U.S. Pat. No. 4,305,307 discloses a separate driven pinion connected to a torsion spring shaft that is adjusted to twist and thereby load the antibacklash driven gear.

Numerous patents have issued disclosing a wide variety of specific geometries to reduce noise and wear characteristics of gear sets. U.S. Pat. No. 1,828,114 discloses mating involute spur gears with sufficient teeth so formed that at all times at least two teeth of each mating gear mesh with at least two teeth on the other gear, thereby preventing overloading of a single tooth on each gear. U.S. Pat. No. 4,140,026 discloses an improvement to conformal gearing by providing flexure to the concave teeth to accommodate the changing geometry as the teeth wear or the center to center distance between the gears increases. Circular arc gear teeth are disclosed in the pinion and internal gear sets of U.S. Pat. No. 4,270,401, wherein a specific tooth geometry is specified.

Specific gear tooth geometries for helical gears are disclosed in U.S. Pat. Nos. 4,292,857 and 4,294,132, both directed to teeth of changing thickness and changing pitch diameter in traversing from the left to the right side of each gear. The specific geometry is directed to controlling backlash between the meshing gears. Specific tooth geometries for rack and pinion backlash elimination is disclosed in U.S. Pat. No. 3,310,990. In this disclosure, the involute gear and rack have modified tooth profiles which define gear contact depending upon the position of the rack relative to the pinion.

Gears that mesh with pins and rollers are sometimes referred to as sprockets, in particular, when the pins or rollers are attached to chains. U.S. Pat. Nos. 4,036,071 and 4,116,081 disclose sprocket and chain combinations wherein the teeth on the sprockets engage rotatable bushings on the chains. In the latter patent, the chain is a part of a crawler tack for a tracked vehicle. The sprocket teeth and rollers undergo severe operating conditions and, therefore, the tooth geometry is selected to minimize stress and wear, and in the case of the tracked vehicles, to also accommodate the buildup of foreign matter between the teeth of the sprocket. In U.S. Pat. No. 4,487,088, the sprocket teeth are relatively widely separated, with the bushings of the chain riding against the roots of the sprocket teeth under high load. These patents disclose relatively large root areas between the sprocket teeth. Conversely, U.S. Pat. No. 3,709,055 discloses teeth and root areas of circular arcs meshing to provide the lobes of a gear pump. U.S. Pat. No. 4,155,599 discloses a driving pinion having epicycloidal gear teeth meshing with cylindrical pins of a rack. The gear teeth are purposely formed with a slender profile to penetrate into the spaces between the cylindrical pins forming the rack. The profile is specifically designed to accommodate differences in pitch distance between the cylindrical pins where racks are joined together lengthwise.

Cycloidal gearing, in general, is the predecessor of involute gearing. Cycloidal gearing has been broadly used in mechanical watch mechanisms. Pin gearing has been a particular case or subset of general cycloidal gearing. Historically, the main advantage for using pin gearing is the possibility of avoiding the generation of the pinion teeth since the pinion is designed as an assembly of cylinders placed between two disks. Further, pin gearing has been examined for its antibacklash gear property.

As stated above, it is an object of the present invention to improve the precision of the drive of a rotary indexable table. It is a further object of the present invention to provide a reliable easily manufactured rotary indexable table and drive associated therefor.

SUMMARY OF THE INVENTION

The above objects of the present invention are achieved with the work table, which may be an indexable work table, with cycloidal drive gear system according to the present invention. The work table of the present invention includes a rotatably mounted work supporting platform. An annular set of drive pins are attached to the turntable assembly, with the drive pins engaged and driven by a cycloidal drive gear which is driven by a servomotor air motor, hydraulic motor, rotary actuator, or any other known prime mover.

In one embodiment of the present invention, the pins may be independently, freely rotatable and attached to a carrier disk secured to the work supporting platform. In another embodiment of the present invention, the cycloidal drive gear may be positioned with its center positioned outside the circle defined by the pins. In another embodiment of the present invention, the pins may be extending downward directly from the work supporting platform, or a carrier in the form of an annular ring attached thereto, and engaged with the cycloidal gear, such that the center of the cycloidal gear is within the circle defined by the pins. The pins may therefore be formed coupled to an annular rim at the peripheral edge of the work supporting platform.

Another aspect of the present invention is retrofitting existing turntable drive systems to incorporate the cycloidal gear drive system according to the present invention. In one such retrofitting operation, the existing drive gear is replaced with a cycloidal drive gear and the previous driven gear mechanism is replaced with a carrier disk or carrier ring having pins for engaging the cycloidal drive gear. Therefore, the drive system of the present invention is easily constructed to be retrofitting into existing turntables.

These and other advantages of the present invention will be clarified in the brief description of the preferred embodiments taken together with the attached figures wherein like reference numerals represent like elements throughout.

DETAILED DESCRIPTION OF THE PREFERRED EMBODIMENTS

Figure 1:
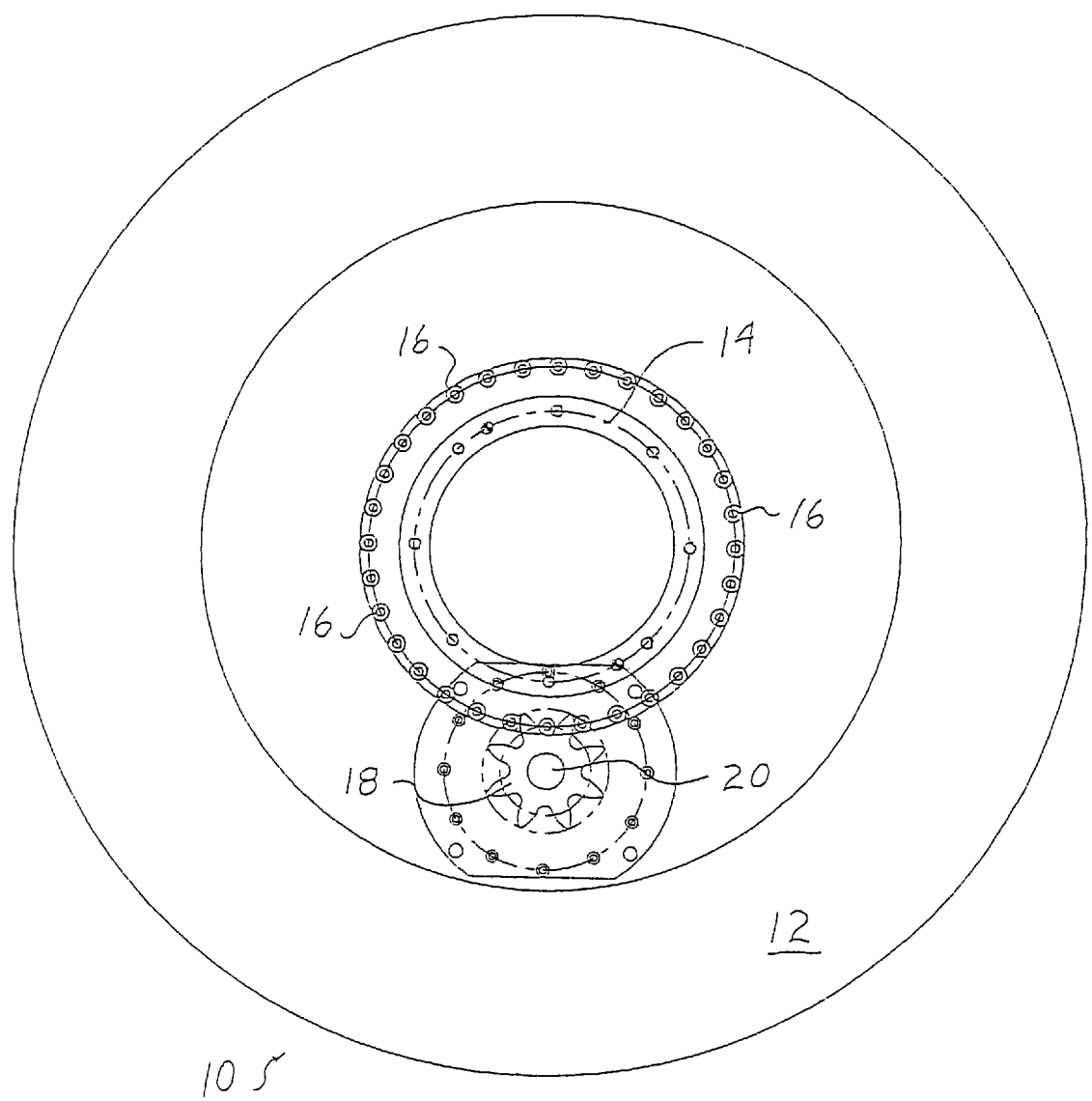
FIG. 1 is a schematic top view of a rotary worktable with cycloidal gear drive system according to the present invention.
Figure 2:
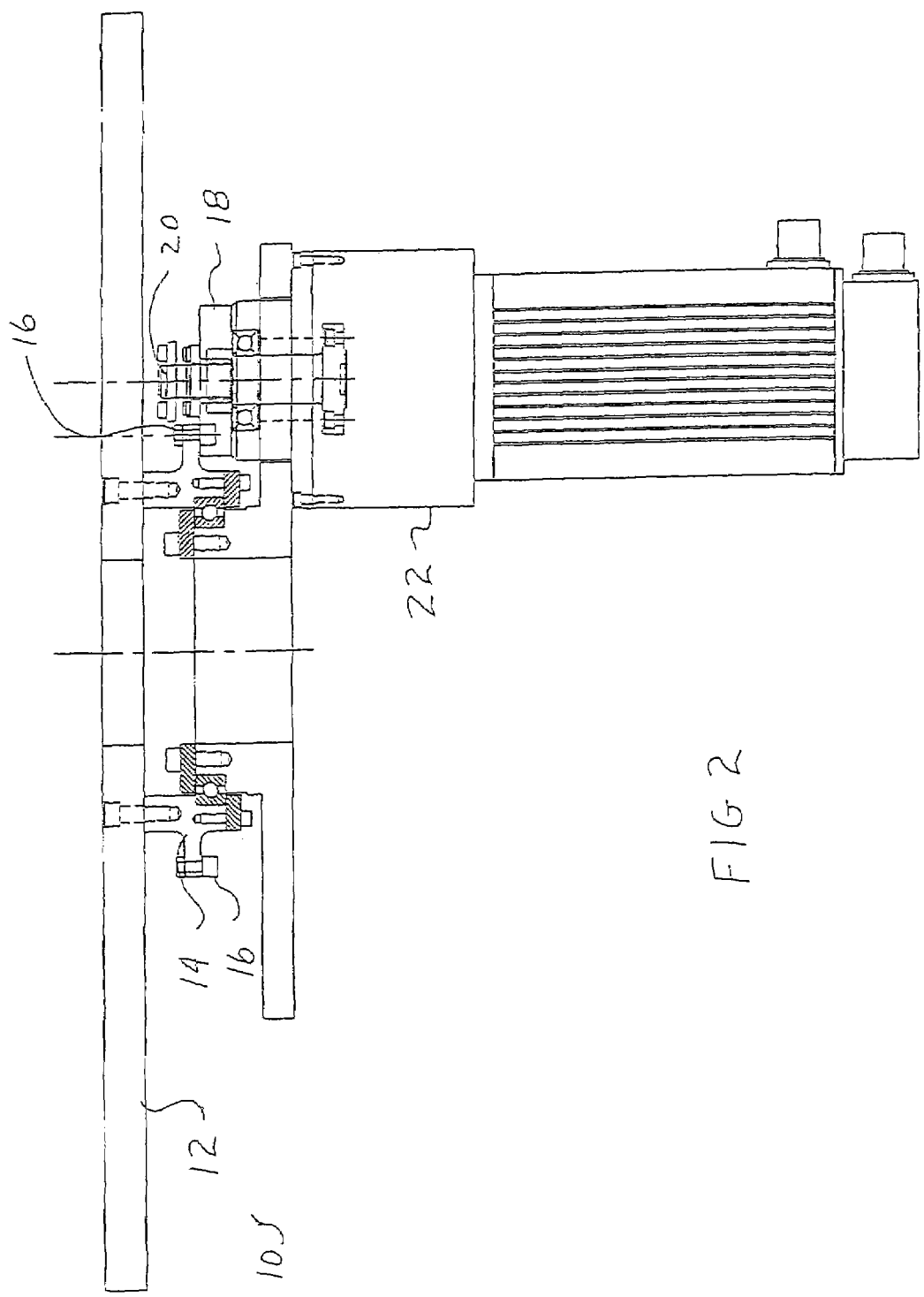
FIG. 2 is a schematic view of the drive system of the rotary table illustrated in FIG. 1.

As shown in FIG. 2, a turntable assembly 10 in FIG. 1, also called a rotary indexable work table, is provided with a work supporting platform 12. The platform 12 is used to support work pieces, tooling, fixtures and the like for positioning as known in the art. The work supporting platform 12 is rotationally mounted to a base as is conventional in the art.

Figure 3:
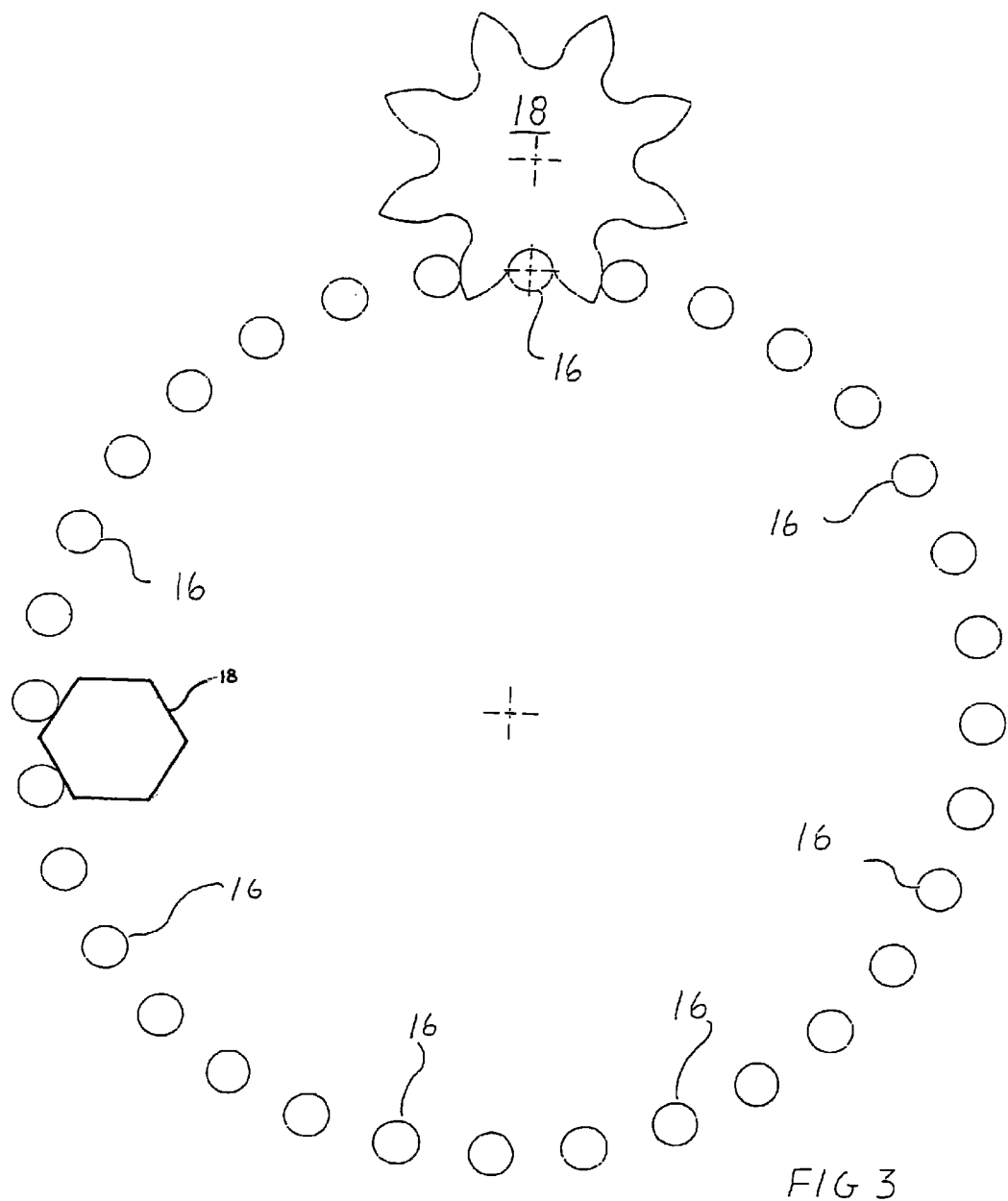
FIG. 3 is a schematic view of the cycloidal gear and pin connection for the drive system illustrated in FIGS. 1 and 2.

Secured to the work supporting platform 12 is a carrier 14, in the form of a disk, having an annular array of pins 16 which can be formed as independently rotatable cam followers secured to the carrier 14. The carrier 14 may be bolted or otherwise secured to the work supporting platform 12 as shown in FIG. 2. The pins 16 are adapted to engage and be driven by a cycloidal gear 18 as best shown in FIGS. 1 and 3. The gear 18 is mounted on a drive shaft 20 driven by a servomotor generally shown at 22 coupled to a conventional controller. The cycloidal gear 18 and pins 16 combine to form cycloidal pin gearing which provides antibacklash gear properties. The minimization of gear backlash will correspond to a more accurate positioning of the work supporting platform 12 and as discussed above, precision in work piece positioning is critical for many uses of conventional turntable designs.

The turntable assembly 10 of the present invention operates in a conventional fashion utilizing the cycloidal drive gear system provided by gear 18 and pins 16. As noted above, the pins 16 may be in the form of rotatable cam followers such as illustrated in FIG. 1. The cycloidal drive gear system of the present invention is also easily retrofitted into existing turntable assemblies. Such a retrofitting operation in a central driven table would entail simply removing the existing drive gear and the associate meshing driven gear attached to the turntable assembly. The carrier 14 with pins 16 would be attached to the work supporting platform of the existing turntable assembly and the cycloidal gear 18 may replace the existing driven gear. A cycloidal drive gear system of the present invention can be retrofitted into existing turntable assemblies which do not incorporate a central drive by the provision of entire motor assembly, i.e., servomotor 22 and drive shaft 20, associated with the cycloidal gear 18. For example, in an existing turntable assembly having a pinion gear engaging a ring gear at the periphery of the work supporting platform 12, the retrofitting can be accomplished by disconnecting the existing pinion and drive motor, removing the ring gear, and installing the drive system of the present invention beneath the existing work supporting platform of the existing turntable assembly. In short, in retrofitting existing turntables, the cycloidal drive gear system of the present invention may, but does not have to be, positioned in the same location as the existing drive system. Changing the location of the drive system, and changing the drive system in general, may also result in appropriate modifications of the control in view of the change in gearing. Such a change in the controls would be well-known to those of ordinary skill in the art.

Figure 4:
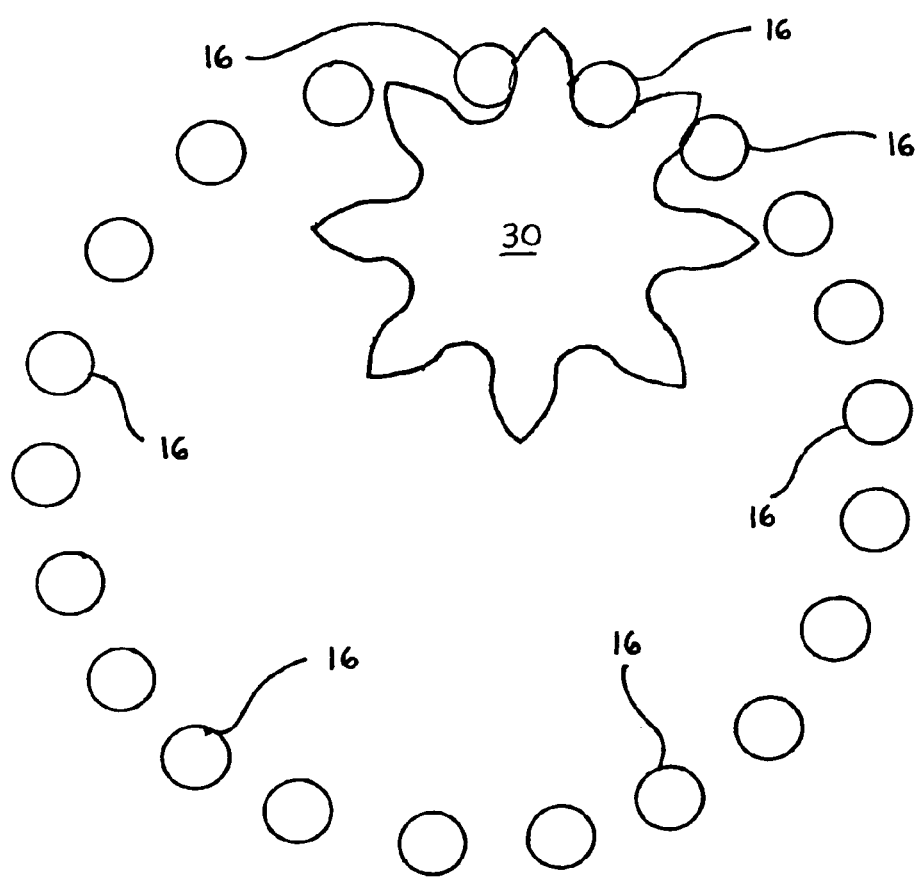
FIG. 4 is a schematic view of a further embodiment of the cycloidal gear and pin connection for the drive system according to the present invention.

The cycloidal gear drive illustrated in the figures incorporates the cycloidal gear 18 outside the circle formed by pins 16. In a further embodiment, the cycloidal gear 30 is positioned within the circle by the engaged pins 16. Such an embodiment is illustrated in FIG. 4. In addition, such positioning may occur by forming the carrier 14 as an annular ring. This construction would be similar to a pinion and sun ring engagement. With such a modification, it can be understood that in retrofitting existing turntable assemblies with a cycloidal gear drive according to the present invention, the cycloidal gear drive can be positioned on the existing drive motor with the carrier 14 and pins 16 formed accordingly as a disk or as an annular ring. Alternatively, as discussed above, retrofitting of existing turntables can be accomplished by providing a completely new positioned motor and drive system. These options provide the flexibility in the construction of a retrofitted turntable assembly.

Finally, the illustrated embodiments show a circular work supporting platform 12. It is understood that the turntable 10 according to the present invention may be in the form of an open centered table or platform 12, such as disclosed in U.S. Pat. No. 5,950,503 which is incorporated herein by reference.

Having described the present invention associated with the illustrated embodiments, it should be understood by those of ordinary skill in the art that these embodiments described and shown are merely illustrative of the present invention and not restrictive thereof. Various modifications may be made to the present invention without departing from the spirit and scope thereof.

What is claimed is:

1. A rotary indexable work table comprising:
   a rotatable work supporting platform;
   a circular array of pins attached to said platform;
   a prime mover for rotating said platform;
   a cycloidal drive gear driven by said prime mover and engaged with said pins for transmitting rotation of the prime mover to said rotatable work supporting table, wherein said cycloidal drive gear and said engaged array of pins form a cycloidal pin gearing drive system for said rotary indexable work tables;
   wherein the cycloidal drive gear is shaped to combine with the pins and form cycloidal pin gearing with antibacklash gear properties for accurate positioning of the rotatable work supporting platform.

2. The work table as claimed in claim 1 wherein the pins are independently rotatable.

3. The work table of claim 2 wherein the prime mover includes a servomotor.

4. The work table of claim 3 wherein the center of rotation of the cycloidal drive gear is positioned outside of the circle defined by the circular array of pins.

5. The work table of claim 3 wherein the center of rotation of the cycloidal drive gear is positioned inside of the circle defined by the circular array of pins.

6. The work table of claim 3 wherein the work supporting platform has an open center.

7. The work table of claim 3 wherein the circular array of pins is attached to the platform through a carrier.

8. An indexable rotary work table for supporting workpieces and moving the workpieces through a plurality of work stations at spaced locations along the work table, the work table comprising:
   a rotatable, substantially planar, circular work supporting platform;
   a pin carrier attached to an undersurface of the work supporting platform;
   a circular array of pins secured to the pin carrier;
   an indexable motor; and
   a cycloidal drive gear driven by the motor and enmeshed with the pins for transmitting rotation from the motor to the work supporting platform, wherein the cycloidal gear and enmeshed pins form a cycloidal pin gearing drive system with, wherein the cycloidal drive gear is shaped to combine with the pins and form cycloidal pin gearing with antibacklash gear properties for accurate positioning of the rotatable work supporting platform.

9. The work table as claimed in claim 8 wherein the pins are independently rotatable cam followers.

10. The work table of claim 9 wherein the motor is a servomotor.

11. The work table of claim 10 wherein the center of rotation of the cycloidal drive gear is positioned outside of the circle defined by the circular array of pins.

12. A method of providing a work table with antibacklash properties comprising the steps of:
   removing an existing ring gear and drive pinion gear from the work table;
   installing a circular array of pins to an underside of a work supporting surface;
   installing a cycloidal drive gear to be driven by an existing motor of the work table, wherein the cycloidal drive gear is enmeshed with the pins for transmitting rotation from the motor to the work supporting platform, wherein the cycloidal gear and enmeshed pins form a cycloidal pin gearing drive system with, wherein the cycloidal drive gear is shaped to combine with the pins and form cycloidal pin gearing with antibacklash gear properties for accurate positioning of the rotatable work supporting platform.

13. The method as claimed in claim 12 wherein the pins are independently rotatable cam followers.

14. The method of claim 13 wherein the center of rotation of the cycloidal drive gear is positioned outside of the circle defined by the circular array of pins.

* * * * *